(12) United States Patent
Makki et al.

(10) Patent No.: US 11,411,689 B2
(45) Date of Patent: Aug. 9, 2022

(54) DYNAMIC USER GROUPING IN NON-ORTHOGONAL MULTIPLE ACCESS (NOMA)—NETWORKS

(71) Applicant: Telefonaktiebolaget LM Ericsson (publ), Stockholm (SE)

(72) Inventors: Behrooz Makki, Gothenburg (SE); Ali Behravan, Stockholm (SE); Mona Hashemi, Gothenburg (SE)

(73) Assignee: TELEFONAKTIEBOLAGET LM ERICSSO (PUBl.), Stockholm (SE)

( * ) Notice: Subject to any disclaimer, the term of this patent is extended or adjusted under 35 U.S.C. 154(b) by 778 days.

(21) Appl. No.: 16/094,741

(22) PCT Filed: May 15, 2018

(86) PCT No.: PCT/EP2018/062456
§ 371 (c)(1),
(2) Date: Oct. 18, 2018

(87) PCT Pub. No.: WO2019/219167
PCT Pub. Date: Nov. 21, 2019

(65) Prior Publication Data
US 2021/0226741 A1    Jul. 22, 2021

(51) Int. Cl.
*H04L 1/18* (2006.01)
*H04B 7/06* (2006.01)
*H04W 72/12* (2009.01)

(52) U.S. Cl.
CPC ......... *H04L 1/1887* (2013.01); *H04B 7/0617* (2013.01); *H04W 72/121* (2013.01)

(58) Field of Classification Search
CPC ... H04L 1/1887; H04B 7/0617; H04W 72/121
See application file for complete search history.

(56) References Cited

U.S. PATENT DOCUMENTS

| 10,182,429 B2 | 1/2019 | Kim et al. | |
|---|---|---|---|
| 2009/0298523 A1* | 12/2009 | Ogawa | H04W 72/1231 455/509 |
| 2013/0329652 A1* | 12/2013 | Pani | H04W 72/121 370/329 |
| 2015/0029926 A1 | 1/2015 | Ryu et al. | |
| 2015/0382327 A1* | 12/2015 | Kishiyama | H04L 27/2601 370/329 |

(Continued)

FOREIGN PATENT DOCUMENTS

WO    2016/148520 A1    9/2016

OTHER PUBLICATIONS

International Search Report and Written Opinion issued in International Application No. PCT/EP2018/062456, dated Feb. 11, 2019, 15 pages.

(Continued)

*Primary Examiner* — Steven H Nguyen
(74) *Attorney, Agent, or Firm* — Rothwell, Figg, Ernst & Manbeck, P.C.

(57) ABSTRACT

A dynamic UE grouping method for dense NOMA systems. One objective is to improve the performance gain by adding virtual diversity into the network. An embodiment allows a network node to consider different groups of UEs for data transmission using NOMA based on the UEs' message decoding status without CSI updates.

7 Claims, 13 Drawing Sheets

(56) References Cited

U.S. PATENT DOCUMENTS

| | | | | |
|---|---|---|---|---|
| 2016/0191174 A1* | 6/2016 | Hwang | ............... | H04J 11/004 |
| | | | | 375/348 |
| 2016/0191175 A1 | 6/2016 | Hwang et al. | | |
| 2017/0332389 A1* | 11/2017 | Sun | ............... | H04J 15/00 |
| 2018/0152257 A1* | 5/2018 | Seo | ............... | H04L 1/1812 |
| 2018/0175968 A1* | 6/2018 | Shin | ............... | H04L 5/0053 |
| 2018/0309530 A1* | 10/2018 | Nguyen | ............... | H04L 1/1812 |
| 2020/0389870 A1* | 12/2020 | Shin | ............... | H04W 72/042 |

OTHER PUBLICATIONS

Saito et al., "Non-Orthogonal Multiple Access (NOMA) for Cellular Future Radio Access", 2013 IEEE 77th Vehicular Technology Conference (VTC Spring), Jun. 1, 2013, pp. 1-5.
3GPP TR 36.866, V12.0.1, (Mar. 2014), 3rd Generation Partnership Project; Technical Specification Group Radio Access Network; Study on Network-Assisted Interference Cancellation and Suppression (NAIC) for LTE (Release 12), Mar. 2014, (64 pages).
3GPP TSG RAN WG1 Meeting #86, R1-166056; Göteborg, Sweden; Aug. 22-26, 2016; MCC Support, "Final Report of 3GPP TSG RAN WG1 #85 v1.0.0", (170 pages).
3GPP TR 36.859, V13.0.0, (Dec. 2015), 3rd Generation Partnership Project; Technical Specification Group Radio Access Network; Study on Downlink Multiuser Superposition Transmission (MUST) for LTE (Release 13), Dec. 2015, (48 pages).
Peng Xu et al., "NOMA: An Information Theoretic Perspective", IEEE, arXiv:1504.07751v2 [cs.IT], May 12, 2015, (6 pages).

\* cited by examiner

DYNAMIC USER GROUPING IN NON-ORTHOGONAL MULTIPLE ACCESS (NOMA)—NETWORKS

CROSS REFERENCE TO RELATED APPLICATION(S)

This application is a 35 U.S.C. § 371 National Stage of International Patent Application No. PCT/EP2018/062456, filed May 15, 2018, designating the United States.

TECHNICAL FIELD

Disclosed are embodiments related to non-orthogonal multiple access (NOMA) communication systems.

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with an access point) with radio resources in a spectrum, cost, and complexity-efficient manner. In 1G-3G wireless communication systems, frequency division multiple access (FDMA), time division multiple access (TDMA) and frequency division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal designs have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same time resource and frequency resource as well as, if applicable, the same code resource and beam resource. Particularly, 3GPP has considered NOMA in different applications. For instance, NOMA has been introduced as an extension of the network-assisted interference cancellation and suppression (NAICS) for inter-cell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

SUMMARY

Using NOMA not only outperforms OMA in terms of sum rate, but is also optimal for achieving the maximum capacity region. Due to the implementation complexity and the decoding delay of NOMA, however, it is of most interest in dense networks with a large number of UEs requiring access at the same time such that there are not enough orthogonal resources to serve the UEs using OMA. When the number of UEs requesting access out-number the orthogonal resources, channel state information (CSI) acquisition becomes the bottleneck of the system performance as it may consume a large portion of the available spectrum. For this reason, NOMA is expected to be more useful in stationary systems working at fixed frequencies, where the channel coefficients remain nearly constant over multiple packet transmissions and CSI update is rarely required. However, due to stationary UEs and absence of frequency hopping, the network suffers from poor network/frequency diversity which significantly affects the performance of, for example, hybrid automatic repeat request (HARQ) protocols and other similar protocols.

In one embodiment, the disclosure describes a dynamic UE grouping method for dense NOMA systems. This dynamic UE grouping method improves performance gain adding virtual diversity into the network. In the proposed scheme, different groups of UEs may be considered by the network node for data transmission using NOMA based on the UEs' message decoding status. The network node then adapts transmission parameters such as the beamforming and the power/rate allocation based on the conditions of the grouped UEs. The UEs, on the other hand, may use different message decoding schemes in different retransmission rounds based on the grouped UEs and the considered HARQ protocol. The proposed scheme is applicable for both downlink and uplink data transmission. Compared to the conventional NOMA techniques, the proposed UE grouping scheme considerably increases network diversity. This leads to significant improvement in error probability. Additionally, the implementation of adaptive power allocation/beamforming in different retransmission rounds significantly improves the performance of HARQ protocols. Particularly, the relative gain of the proposed scheme increases in dense scenarios which are of most interest in NOMA-based systems Accordingly, in one aspect there is provided a dynamic UE grouping method performed by a network node. The method includes the network node determining a first group of user equipments, UEs, for downlink, DL, data transmission, the first group comprising a first UE and a second UE. The method also includes the network node transmitting to both the first and second UE a first superimposed signal comprising a first message for the first UE and a second message for the second UE. The method also includes the network node receiving a first negative acknowledgement, NACK, transmitted by the first UE, the first NACK indicating that the first UE was unable to decode the first message. The method also includes the network node determining a second group of UEs for DL data transmission as a result of receiving the first NACK, the second group comprising the first UE and a third UE. The method also includes the network node transmitting to both the first and third UE a second superimposed signal comprising the first message and a third message for the third UE.

In some embodiments, the step of transmitting the first superimposed signal includes using a first set of beam forming weights to transmit the first superimposed signal. In some embodiments, the step of transmitting the second superimposed signal includes: (i) using the first set of beam forming weights to transmit the second superimposed signal or (ii) using a second set of beam forming weights to transmit the second superimposed signal.

In another aspect there is provided a method performed by a network node. The method includes the network node determining a first group of user equipments, UEs, for uplink, UL, data transmission, the first group comprising a first UE and a second UE. The method also includes the network node allocating first time and frequency resources to the first UE so that the first UE can use the first time and frequency resources in transmitting a first signal comprising a first message. The method also includes the network node allocating the first time and frequency resources to the second UE so that the second UE can use the first time and frequency resources in transmitting a second signal comprising a second message. The method also includes the network node receiving a first superimposed signal comprising the first message and the second message. The method also includes the network node determining that the first message cannot be successfully decoded. The method also includes the network node determining a second group of UEs for UL data transmission as a result of determining that the first message cannot be successfully decoded, the second group comprising the first UE and a third UE. The method also includes the network node allocating second time and frequency resources to the first UE so that the first UE can use the second time and frequency resources in transmitting a third signal comprising the first message. The method also includes the network node allocating the second time and frequency resources to the third UE so that the third UE can use the second time and frequency resources in transmitting a fourth signal comprising a third message. The method also includes the network node receiving a second superimposed signal comprising the first message and the third message.

In some embodiments, the step of receiving the first superimposed signal includes using a first set of beam forming weights to receive the first superimposed signal. In some embodiments, the step of receiving the second superimposed signal includes: (i) using the first set of beam forming weights to receive the second superimposed signal or (ii) using a second set of beam forming weights to receive the second superimposed signal.

In some embodiments, the step of determining that the first message cannot be successfully decoded includes successfully decoding the second message and unsuccessfully decoding the first message. In some embodiments, the step of allocating the first time and frequency resources includes identifying a first frequency resource, and the step of allocating the second time and frequency resources includes identifying one of: the first frequency resource and a second frequency resource.

BRIEF DESCRIPTION OF THE DRAWINGS

The accompanying drawings, which are incorporated herein and form part of the specification, illustrate various embodiments.

DETAILED DESCRIPTION

Figure 1:
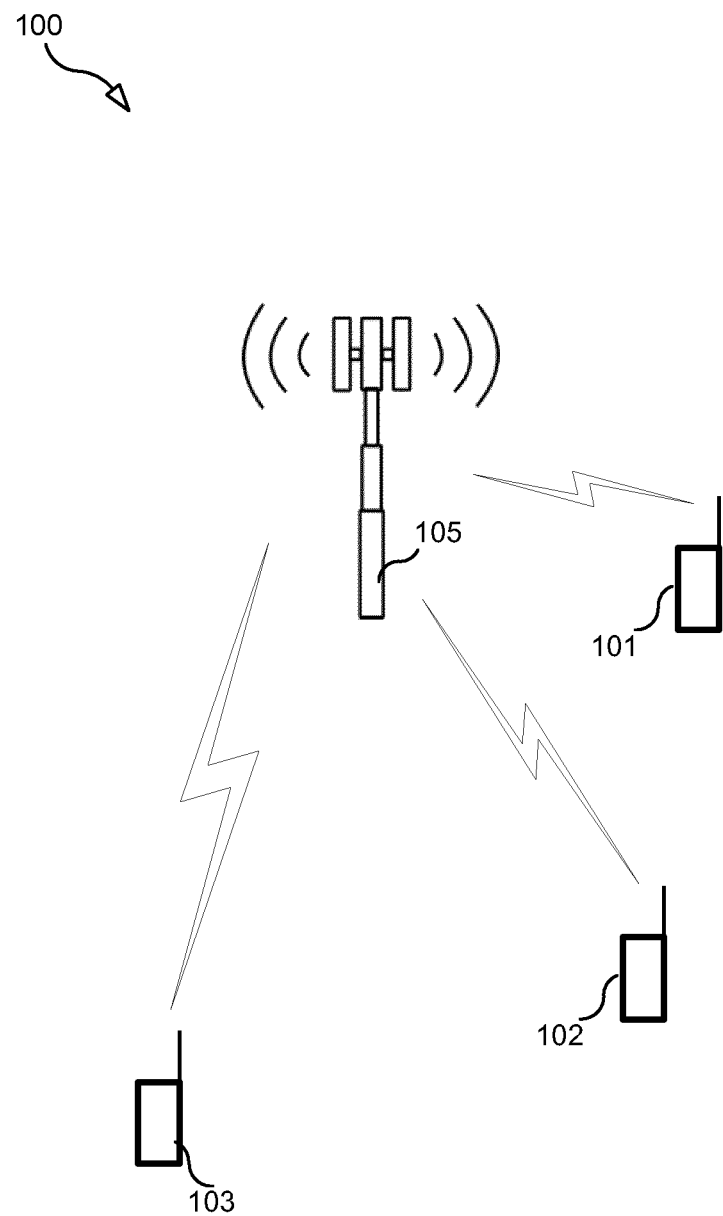
FIG. 1 illustrates a network node communicating simultaneously with a first UE, a second UE, and a third UE.

FIG. 1 illustrates a network 100 having a network node (NN) 105 (e.g., a system comprising a 4G or 5G base station or other access point) serving a large number of UEs—e.g., UE 101, UE 102, UE 103, etc. While only three UEs are shown, NN 105 may serve N number of UEs, where N>>3. The UEs connect to NN 105 using a limited number of spectrum resource blocks, i.e., time-frequency chunks.

Let us consider a frequency slot, so that the time-frequency chunks refer to different time slots. Also, denote the number of UEs by N and the number of chunks by N_c and assume that N_c<N, —that is, the number of resources are not enough to serve all UEs in orthogonal resources. In an ideal case, NOMA has the potential to improve the performance of OMA-based systems, in terms of network capacity, and provide connections for a number of UEs larger than the number of orthogonal resources. However, the performance gain of NOMA typically depends much on the amount of channel state information (CSI) available. Particularly, the throughput of NOMA-based approach depends on if there is an appropriate UE grouping, proper beamforming, and rate/power allocation. However, to perform an appropriate UE grouping/resource allocation, we need to have accurate information about the quality of various channels between the UEs and NN 105. The acquisition of such information leads to huge overhead in dense networks. On the other hand, even with CSI, the implementation complexity of UE grouping/resource allocation algorithms increases significantly as the number of UEs increases. For these reasons, NOMA is expected to be of much interest in stationary networks working at fixed frequencies such that CSI acquisition/feedback and UE grouping/resource allocation are not updated as frequently. Such stationary systems, however, suffer from low network/frequency diversity and may experience low network reliability as a result. This is especially true because with NOMA, each UE may need to decode the messages of other grouped UEs to decode its own message, which may lead to higher error probability compared to conventional OMA-based systems. Additionally, such lack of network/frequency diversity is particularly important for HARQ protocols which, in principle, increase the chance of successful message decoding by adding diversity in different retransmission rounds. Therefore, to improve the reliability of stationary NOMA-based dense networks, it is beneficial to add "virtual" diversities into the network without a need for instantaneous CSI/transmit parameter updates.

In the following descriptions, UE 101 is referred to as $UE_1$, UE 102 is referred to as $UE_2$, and UE 103 is referred to as $UE_3$.

Figure 2:
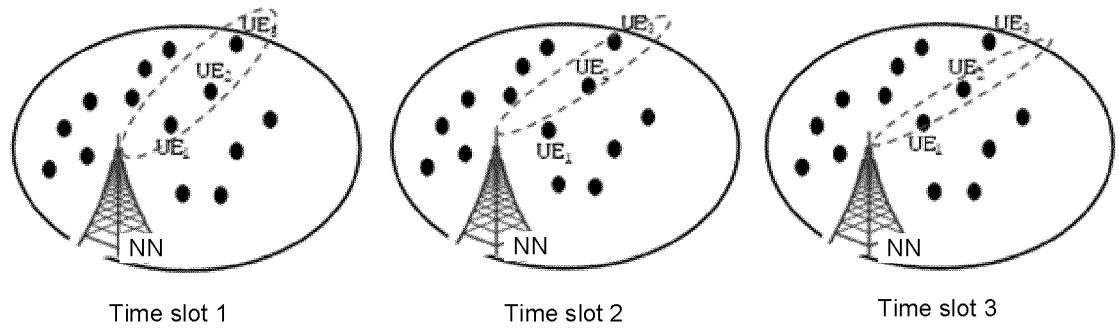
FIG. 2 illustrates UE grouping in different time slots according to some embodiments.
Figure 2:
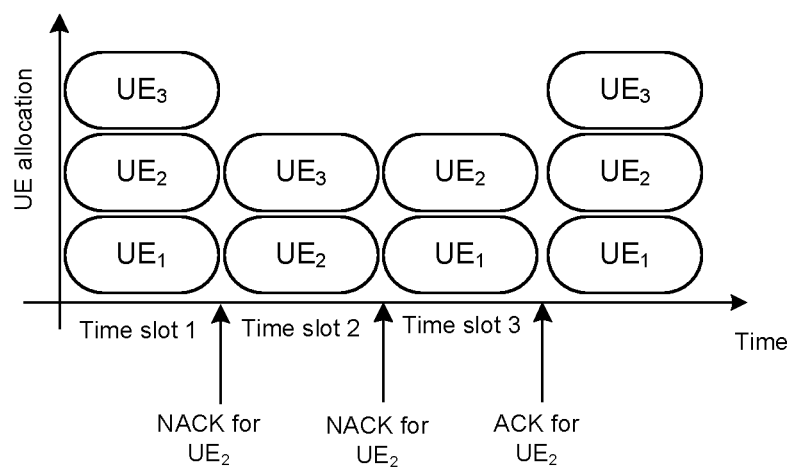

FIG. 2 illustrates dynamic UE grouping in a dense downlink NOMA-based network according to some embodiments. As shown in FIG. 2, each UE may be grouped in a different preconfigured group of UEs in successive retransmission rounds (i.e., different time slots) depending on the UE's message decoding status.

Let us now consider the data transmission to $UE_2$ in reference to the network shown in FIG. 2. In some embodiments, NN 105 considers a set of predefined UE grouping configurations for each UE. For example, the considered predefined UE grouping configurations for $UE_2$ may be $\{(UE_1, UE_2, UE_3), (UE_1, UE_2), (UE_2, UE_2)\}$ as shown in FIG. 2. NN 105 transmits a first superimposed signal using a first frequency and time resource (also referred to as a first frequency and time slot) for the first UE grouping which includes $UE_1$, $UE_2$, and $UE_3$. In such instances, the first superimposed signal comprises a first message for $UE_1$, a second message for $UE_2$, and a third message for $UE_3$. Then, depending on the UEs' message decoding conditions, NN 105 may switch to a different grouping in a subsequent retransmission round.

For example, NN 105 may receive a NACK from the $UE_2$ (i.e., information indicating that UE2 has not been able to obtain the second message from the transmitted signal) and then, as a result, NN 105 retransmits the second message by transmitting a second superimposed signal using a second frequency and time resource (also referred to as a second frequency and time slot) for the second UE grouping which includes $UE_2$ and $UE_3$. The second superimposed signal comprises the second message for $UE_2$ and the third message for $UE_3$. While the time slot for each retransmission round is different, NN 105 may use the same frequency resources to transmit a superimposed signal in each retransmission round according to some embodiments. In some alternative embodiments, NN 105 may use different frequency resources to transmit a superimposed signal in each retransmission round. Additionally, NN 105 may adapt transmission powers, rates, and beamforming based on the considered UE grouping and number of retransmission rounds according to some embodiments. In some embodiments, NN 105 may instantaneously inform the UEs about the considered grouping configuration. In turn, the UEs may adapt their message decoding scheme based on the instantaneous grouping configuration.

In one embodiment, the following steps for may be performed by NN 105 in a downlink NOMA-based network:

Step 1: in a first round of transmission (i.e., in a first time slot 1), NN 105 transmits a first superimposed signal comprising messages for a preconfigured group of UEs.

Step 2: NN 105 receives positive acknowledgement (ACK) or negative acknowledgement (NACK) feedback signals from each UE in the preconfigured group of UEs depending on the UEs' message decoding status.

Step 3: in each subsequent retransmission round (i.e., in a second time slot 2 or third time slot 3), NN 105 considers another preconfigured group of UEs depending on the UEs' message decoding status. Accordingly, NN 105 updates a corresponding beamforming and rate/power allocation and sends a superimposed signal comprising messages for the preconfigured group of UEs.

In one embodiment, the following steps for may be performed by a UE in a downlink NOMA-based network:

Step 1: the UE considers an appropriate decoding scheme in each round of transmission/retransmission based on the grouped UEs and their relative channel conditions in addition to the considered HARQ protocol.

Step 2: the UE attempts to decode its message during each round of based on messages accumulated in previous rounds of transmission/retransmission.

A more specific example of the disclosed embodiments is described below.

With reference to FIG. 2, $UE_1$ experiences the best channel condition and $UE_3$ experiences the worst channel condition based on a comparison of each of the links between NN 105 and the UEs. In this example, we are interested in the performance of $UE_2$ and it is assumed that the messages for $UE_1$ and $UE_3$ can be correctly decoded. The embodiments disclosed herein, however, are not restricted to this example and are also applicable for other UEs with different channel conditions and/or message decoding statuses.

As shown in FIG. 2, NN 105 initially groups $UE_1$, $UE_2$, and $UE_3$ and transmits their corresponding messages in a NOMA-based fashion. That is, NN 105 transmits, using a first frequency and time resource, a first superimposed signal comprising a first message for $UE_1$, a second message for $UE_2$, and a third message for $UE_3$. The $UE_2$ considers the signals of $UE_1$ as interference and uses successive interference cancellation (SIC) to first decode and remove the third message for $UE_3$ and subsequently decode its own message (the second message). If the $UE_2$ fails to successfully decode its message, the $UE_2$ sends a NACK to NN 105.

Upon receipt of the NACK, NN 105 considers a second grouping of UEs which, in this example, includes $UE_2$ and $UE_3$ and retransmits their corresponding messages in a NOMA-based fashion. That is, NN 105 transmits, using a second frequency and time resource, a second superimposed signal comprising the second message for $UE_2$ and either the third message for $UE_3$ or a fourth message for $UE_3$. In such embodiments, NN 105 utilizes proper transmission powers/rates and beamforming when transmitting the second superimposed signal. $UE_2$ then reattempts to decode its message based on the considered HARQ protocol. If NN 105 receives another NACK from the $UE_2$, NN 105 considers a third grouping of UEs which, in this example, includes $UE_1$ and $UE_2$ and retransmits their corresponding messages in a NOMA-based fashion. That is, NN 105 transmits a third superimposed signal comprising a message for $UE_1$ and the second message for $UE_2$. In such embodiments, NN 105 utilizes proper transmission powers/rates and beamforming when transmitting the third superimposed signal.

While the channel coefficients remain the same, the embodiments disclosed herein enable the UEs to experience different interference in different retransmission rounds (also the UEs may use different decoding schemes in the different retransmission rounds based on the channel qualities of the grouped UEs). Accordingly, network diversity is increased and the error probability for the UEs decreases considerably. In some embodiments, the protocol for UE grouping in different retransmission rounds and corresponding parameter settings may be determined offline with no additional CSI overhead in view of the stationary condition of the network.

In some embodiments, the effectiveness of the proposed scheme may depend on whether appropriate UEs located at nearly identical angles to NN 105 can be found such that each UE can be served by NN 105 with a reasonably narrow beam in different retransmission rounds, as shown in FIG. 2. The probability of finding such UEs increases with the number of UEs. Accordingly, the proposed scheme is useful in dense networks which are of most interest in NOMA-based systems.

The proposed scheme can also be used in an uplink NOMA-based network according to some embodiments. In one embodiment, the following steps for may be performed by a UE in an uplink NOMA-based network:

Step 1: in a first round of transmission (i.e., in a first time slot 1), a first group of UEs including the UE send their uplink data within a first time and frequency resource specified by NN 105. In some embodiments, the first group of UEs is already specified by NN 105.

Step 2: after NN 105 attempts to decode the uplink data, each of the UEs in the first groups receives an ACK or a NACK for the first round of transmission from NN 105. In the subsequent retransmission (i.e., in a second time slot 2), a second group of UEs including the UE send their uplink data within a second time and frequency resource specified by NN 105. In some embodiments, the second group of UEs is specified by NN 105. NN 105 may determine the second group of UEs based on the UEs' transmission schemes, power, and pathloss, among others.

In one embodiment, the following steps may be performed by NN 105 in an uplink NOMA-based network:

Step 1: NN 105 determines a first group of UEs including a first UE based on the UEs' transmission schemes, power, path-loss, among others.

Step 2: NN 105 receives uplink information (messages) from the first group of UEs using a first time and frequency resource specified by NN 105.

Step 3: NN 105 attempts to decode the message transmitted by the first UE. If NN 105 determines that the message cannot be successfully decoded, NN 105 determines a second group of UEs including the first UE based on the UEs' transmission schemes, power, path-loss, among others. NN 105 receives uplink information from the second group of UEs using a second time and frequency resource specified by NN 105.

Figure 3:
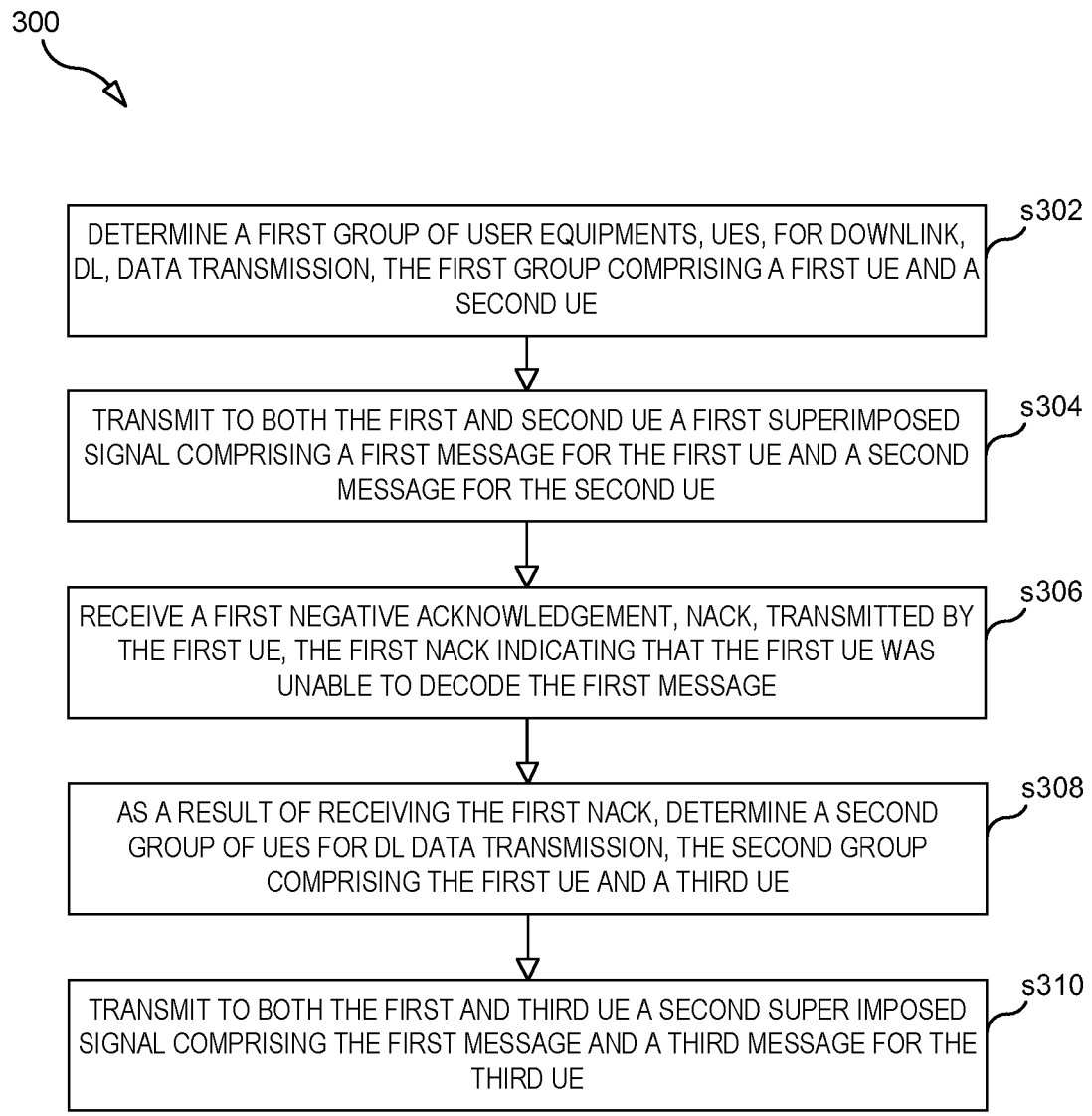
FIG. 3 is a flow chart illustrating a process according to one embodiment.

FIG. 3 is a flow chart illustrating a dynamic UE grouping process 300, according to an embodiment, that is performed by the network node. Process 300 may begin in step s302 where the network node determines a first group of UEs for DL data transmission, the first group comprising a first UE and a second UE. In step s304, the network node transmits to both the first and second UE a first superimposed signal comprising a first message for the first UE and a second message for the second UE. In step s306, the network node receives a first negative acknowledgement (NACK) transmitted by the first UE, the first NACK indicating that the first UE was unable to decode the first message. In step s308, the network node determines a second group of UEs for DL data transmission as a result of receiving the first NACK, the second group comprising the first UE and a third UE. In step s310, the network node transmits to both the first and third UE a second superimposed signal comprising the first message and a third message for the third UE.

In some embodiments, the step of transmitting the first superimposed signal includes using a first set of beam forming weights to transmit the first superimposed signal. In some embodiments, the step of transmitting the second superimposed signal includes: (i) using the first set of beam forming weights to transmit the second superimposed signal or (ii) using a second set of beam forming weights to transmit the second superimposed signal.

Figure 4:
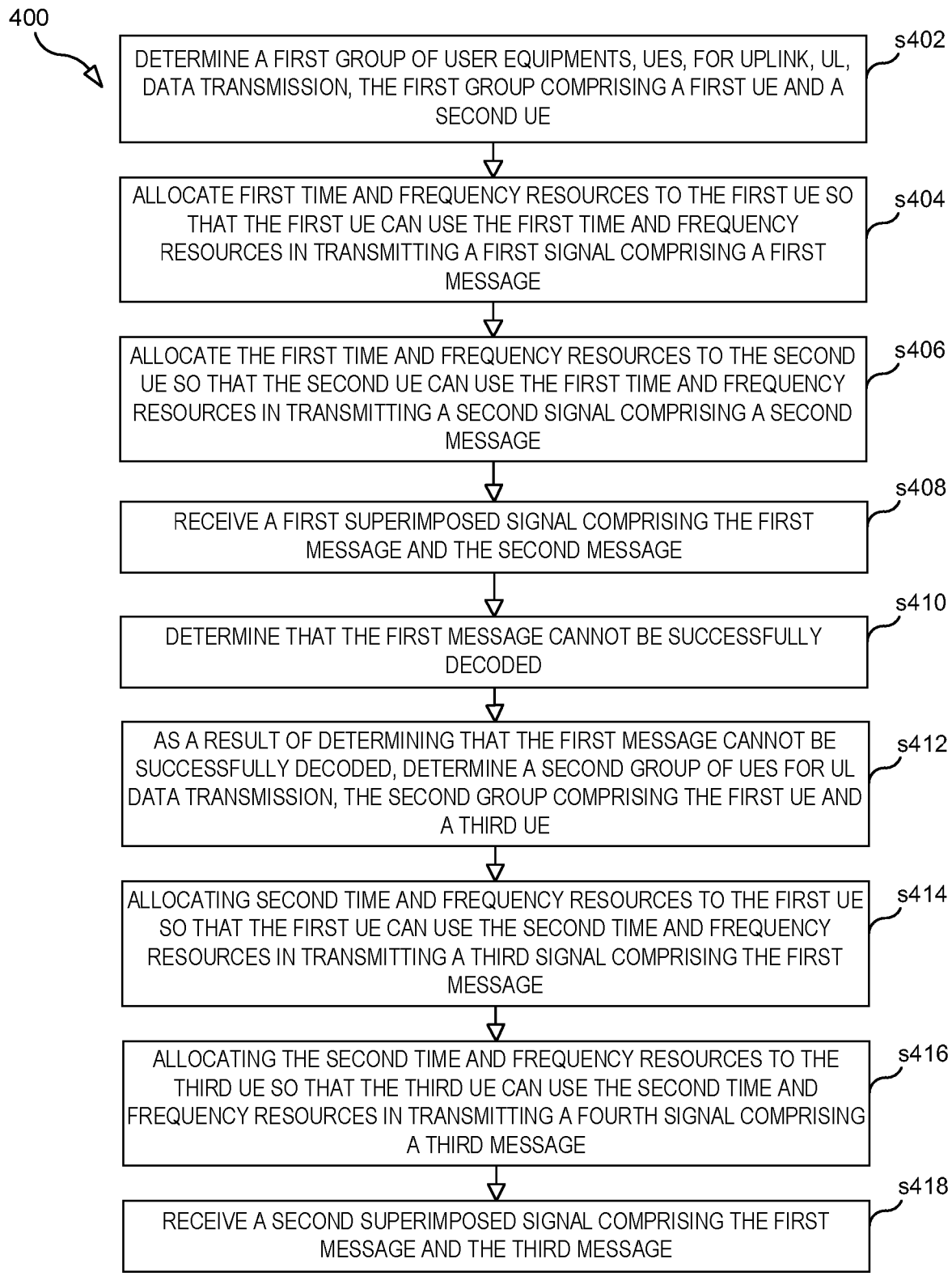
FIG. 4 is a flow chart illustrating a process according to one embodiment.

FIG. 4 is a flow chart illustrating a dynamic UE grouping process 400, according to an embodiment, that is performed by the network node. Process 400 may begin in step s402 where the network node determines a first group of user equipments, UEs, for uplink, UL, data transmission, the first group comprising a first UE (101) and a second UE (102). In step s404, the network node allocates first time and frequency resources to the first UE so that the first UE can use the first time and frequency resources in transmitting a first signal comprising a first message. In step s406, the network node allocates the first time and frequency resources to the second UE so that the second UE can use the first time and frequency resources in transmitting a second signal comprising a second message. In step s408, the network node receives a first superimposed signal comprising the first message and the second message. In step s410, the network node determines that the first message cannot be successfully decoded. In step s412, the network node determines a second group of UEs for UL data transmission as a result of determining that the first message cannot be successfully decoded, the second group comprising the first UE and a third UE. In step s414, the network node allocates second time and frequency resources to the first UE so that the first UE can use the second time and frequency resources in transmitting a third signal comprising the first message. In step s416, the network node allocates the second time and frequency resources to the third UE so that the third UE can use the second time and frequency resources in transmitting a fourth signal comprising a third message. In step s418, the network node receives a second superimposed signal comprising the first message and the third message.

In some embodiments, the step of receiving the first superimposed signal includes using a first set of beam forming weights to receive the first superimposed signal. In some embodiments, the step of receiving the second superimposed signal includes: (i) using the first set of beam forming weights to receive the second superimposed signal or (ii) using a second set of beam forming weights to receive the second superimposed signal.

In some embodiments, the step of determining that the first message cannot be successfully decoded includes successfully decoding the second message and unsuccessfully decoding the first message. In some embodiments, the step of allocating the first time and frequency resources includes identifying a first frequency resource, and the step of allocating the second time and frequency resources includes identifying one of: the first frequency resource and a second frequency resource.

Figure 5:
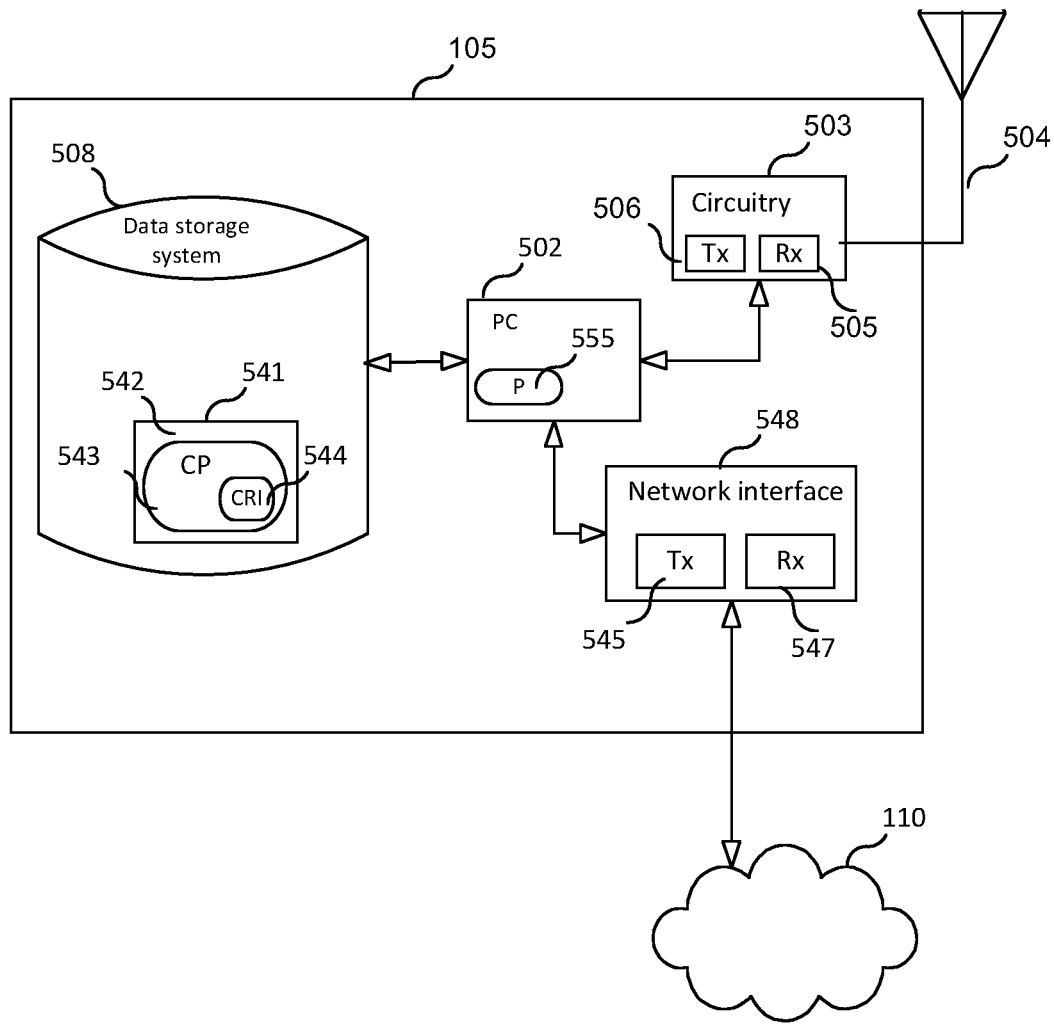
FIG. 5 is a block diagram of a network node according to one embodiment.

FIG. 5 is a block diagram of NN 105, according to some embodiments for performing methods disclosed herein. As shown in FIG. 5, NN 105 may comprise: processing circuitry (PC) 502, which may include one or more processors (P) 555 (e.g., a general purpose microprocessor and/or one or more other processors, such as an application specific integrated circuit (ASIC), field-programmable gate arrays (FPGAs), and the like), which processors may be co-located or distributed in different locations; a network interface 548 comprising a transmitter (Tx) 545 and a receiver (Rx) 547 for enabling NN 105 to transmit data to and receive data from other nodes connected to a network 110 (e.g., an Internet Protocol (IP) network) to which network interface 548 is connected; circuitry 503 (e.g., radio transceiver circuitry comprising an Rx 505 and a Tx 506) coupled to an antenna system 504 for wireless communication with UEs); and a local storage unit (a.k.a., "data storage system") 508, which may include one or more non-volatile storage devices and/or one or more volatile storage devices. In embodiments where PC 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some embodiments, the CRI 544 of computer program 543 is configured such that when executed by PC 502, the CRI causes NN 105 to perform steps described herein (e.g., steps described herein with reference to the flow charts). In other embodiments, NN 105 may be configured to perform steps described herein without the need for code. That is, for example, PC 502 may consist merely of one or more ASICs.

Hence, the features of the embodiments described herein may be implemented in hardware and/or software.

Figure 6:
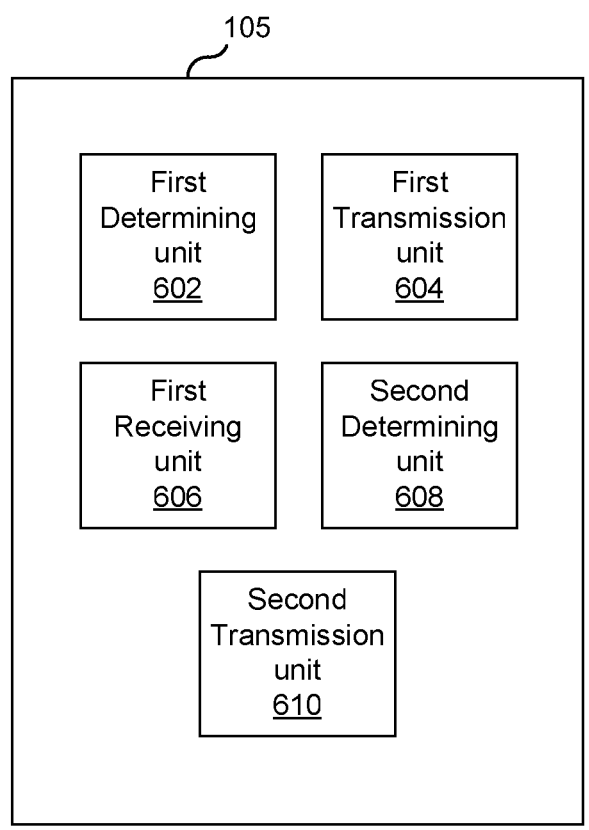
FIG. 6 is a diagram showing functional units of a network node according to one embodiment.

FIG. 6 is a diagram showing functional units of NN 105 according to one embodiment. In the embodiment shown, NN 105 includes: a first determining unit 602 for determining a first group of user equipments, UEs, for downlink, DL, data transmission, the first group comprising a first UE and a second UE; a first transmission unit 604 for transmitting to both the first and second UE a first superimposed signal comprising a first message for the first UE and a second message for the second UE; a first receiving unit 606 for receiving a first negative acknowledgement, NACK, transmitted by the first UE, the first NACK indicating that the first UE was unable to decode the first message; a second determining unit 608 for determining a second group of UEs for DL data transmission as a result of receiving the first NACK, the second group comprising the first UE and a third UE; and a second transmission unit 610 for transmitting to both the first and third UE a second superimposed signal comprising the first message and a third message for the third UE.

Figure 7:
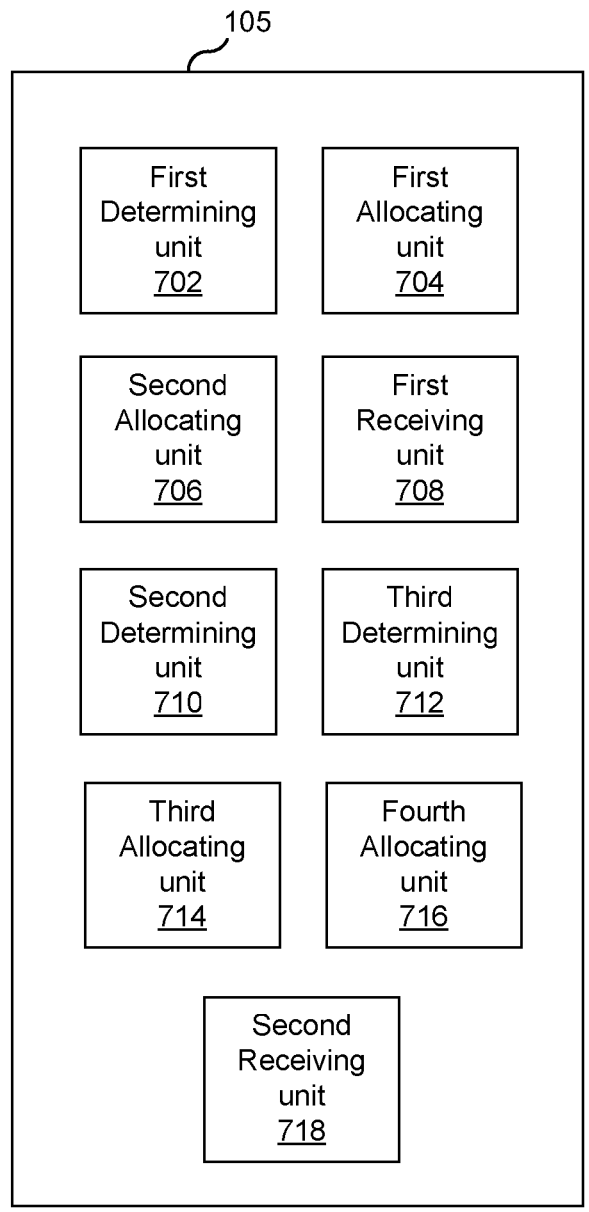
FIG. 7 is a diagram showing functional units of a network node according to one embodiment.

FIG. 7 is a diagram showing functional units of NN 105 according to one embodiment. In the embodiment shown, NN 105 includes a first determining unit 702 for determining a first group of user equipments, UEs, for uplink, UL, data transmission, the first group comprising a first UE and a second UE; a first allocating unit 704 for allocating first time and frequency resources to the first UE so that the first UE can use the first time and frequency resources in transmitting a first signal comprising a first message; a second allocating unit 706 for allocating the first time and frequency resources to the second UE so that the second UE can use the first time and frequency resources in transmitting a second signal comprising a second message; a first receiving unit 708 for receiving a first superimposed signal comprising the first message and the second message; a second determining unit 710 for determining that the first message cannot be successfully decoded; a third determining unit 712 for determining a second group of UEs for UL data transmission as a result of determining that the first message cannot be successfully decoded, the second group comprising the first UE and a third UE; a third allocating unit 714 for allocating second time and frequency resources to the first UE so that the first UE can use the second time and frequency resources in transmitting a third signal comprising the first message; a fourth allocating unit for allocating the second time and frequency resources to the third UE so that the third UE can use the second time and frequency resources in transmitting a fourth signal comprising a third message; and a second receiving unit 718 for receiving a second superimposed signal comprising the first message and the third message.

Figure 8:
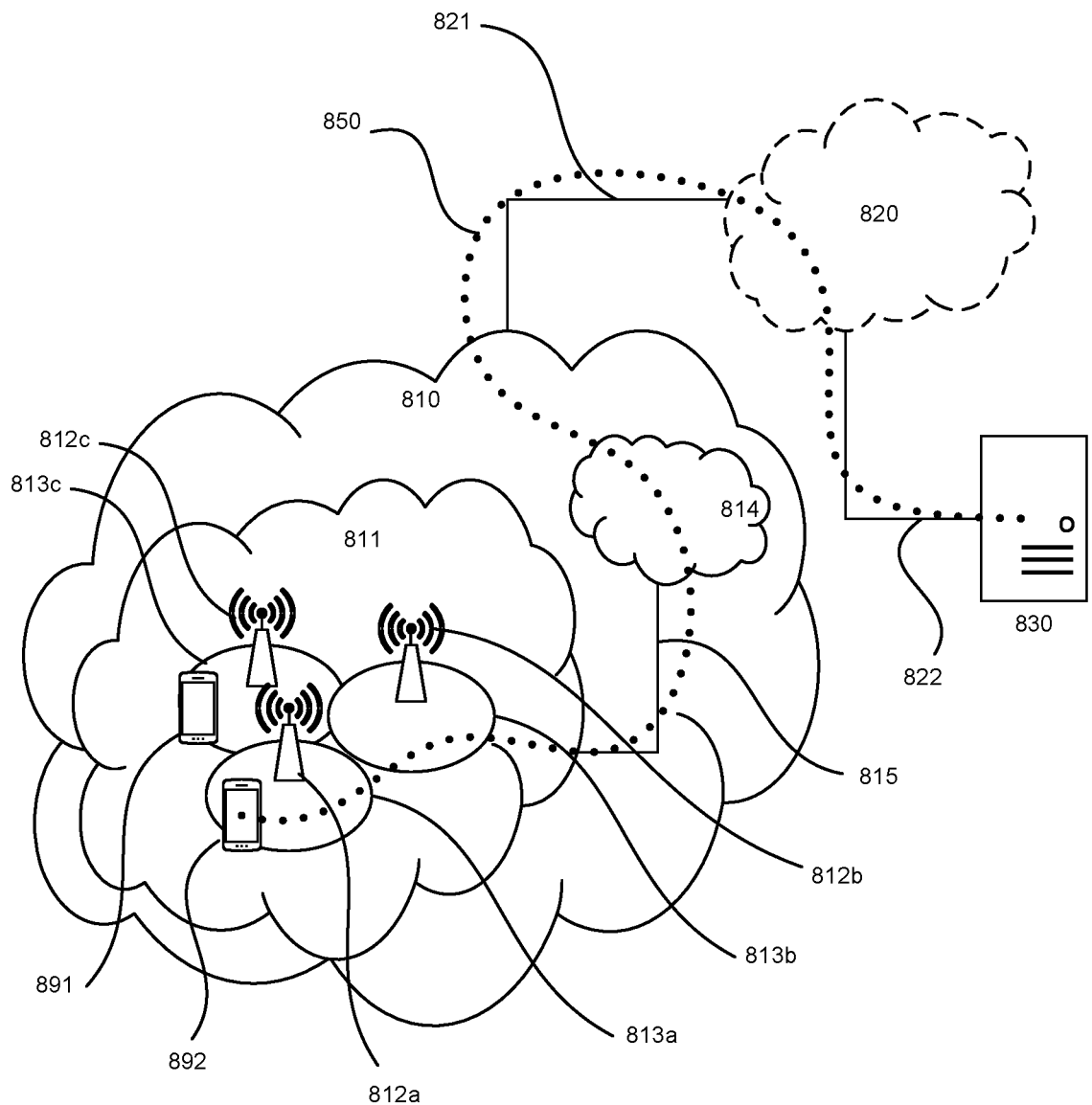
FIG. 8 schematically illustrates a telecommunication network connected via an intermediate network to a host computer.

FIG. 8 illustrates a telecommunication network connected via an intermediate network to a host computer in accordance with some embodiments. With reference to FIG. 8, in accordance with an embodiment, a communication system includes telecommunication network 810, such as a 3GPP-type cellular network, which comprises access network 811, such as a radio access network, and core network 814. Access network 811 comprises a plurality of APs (hereafter base stations) 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9, which illustrates a host computer communicating via a base station with a user equipment over a partially wireless connection in accordance with some embodiments. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 9:
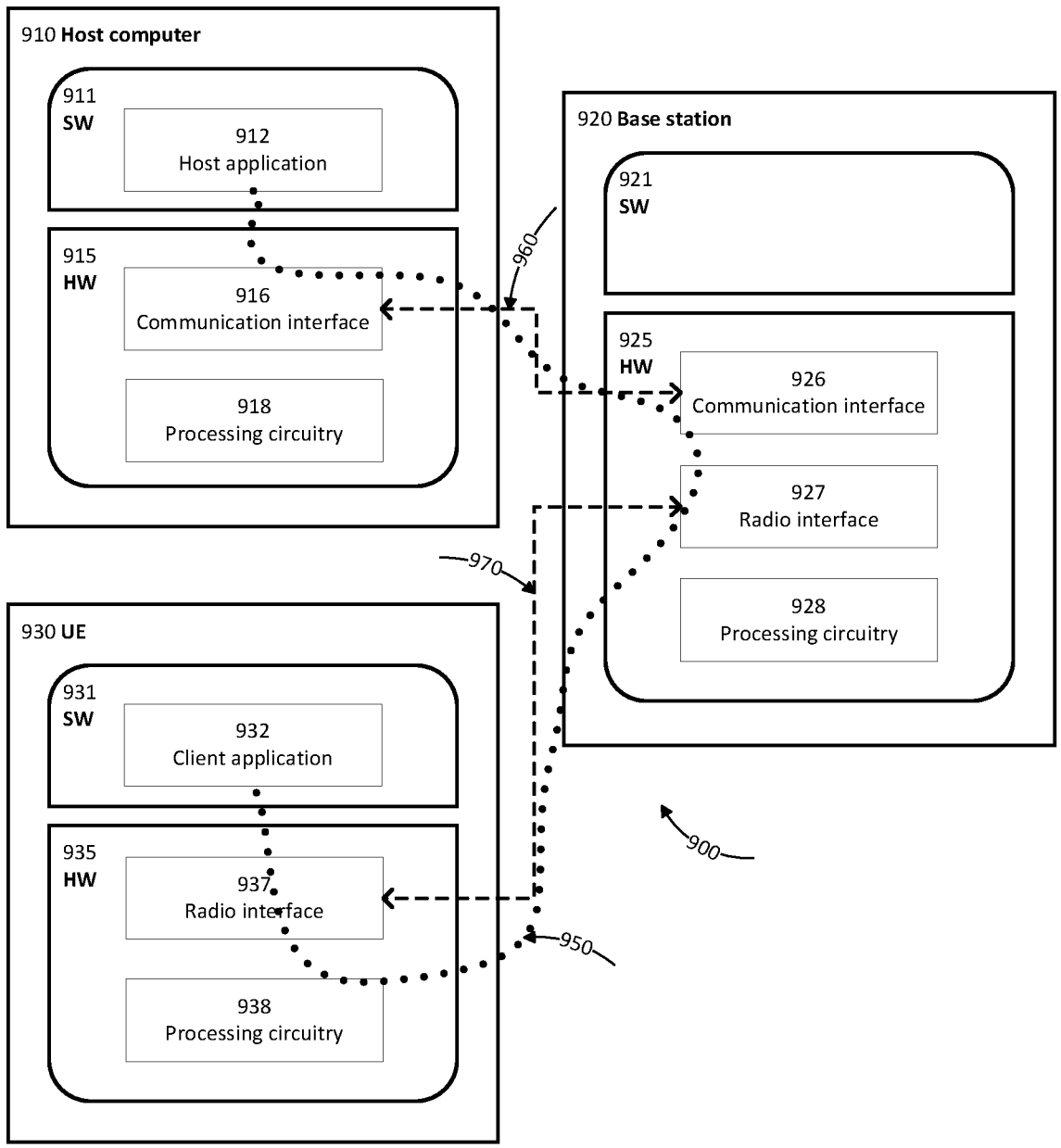
FIG. 9 is a generalized block diagram of a host computer communicating via a base station with a user equipment over a partially wireless connection.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve one or more of the data rate, latency, block error ratio (BLER), overhead, and power consumption and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
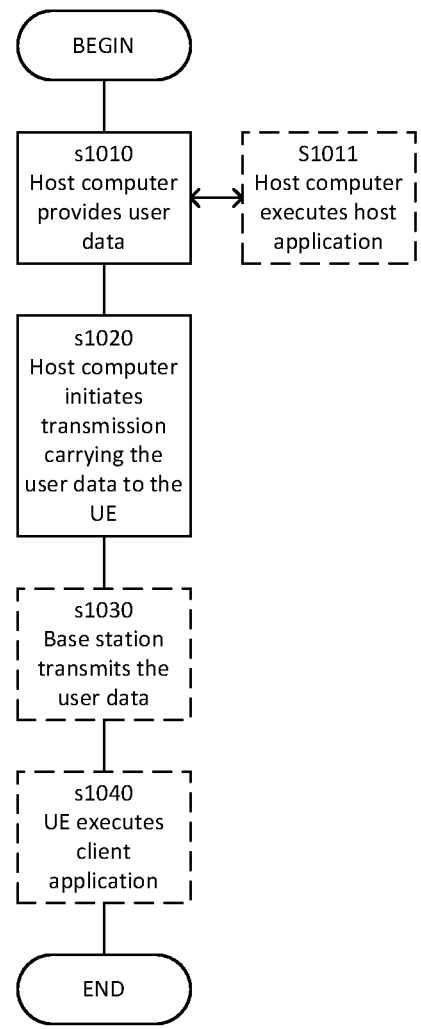
FIG. 10 is a flowchart illustrating a method implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIG. 8 and FIG. 9. In step S1010, the host computer provides user data. In substep S1011 (which may be optional) of step S1010, the host computer provides the user data by executing a host application. In step S1020, the host computer initiates a transmission carrying the user data to the UE. In step S1030 (which may be optional), the base station transmits to the UE the user data which was carried in the transmission that the host computer initiated, in accordance with the teachings of the embodiments described throughout this disclosure. In step S1040 (which may also be optional), the UE executes a client application associated with the host application executed by the host computer.

Figure 11:
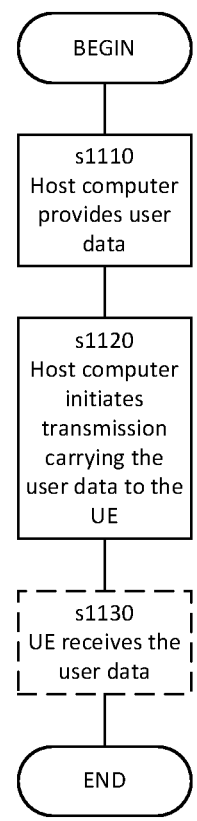
FIG. 11 is a flowchart illustrating a method implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 11 will be included in this section. In step S1110 of the method, the host computer provides user data. In an optional substep (not shown) the host computer provides the user data by executing a host application. In step S1120, the host computer initiates a transmission carrying the user data to the UE. The transmission may pass via the base station, in accordance with the teachings of the embodiments described throughout this disclosure. In step S1130 (which may be optional), the UE receives the user data carried in the transmission.

Figure 12:
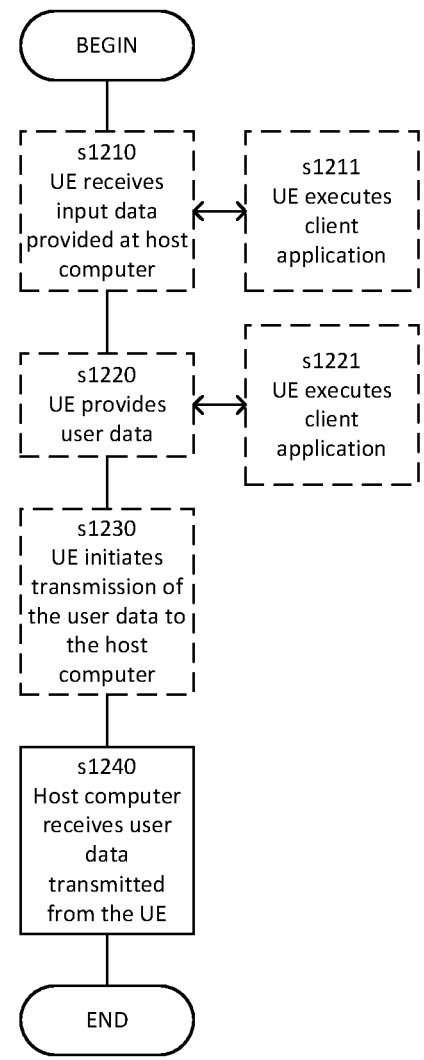
FIG. 12 is a flowchart illustrating a method implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 12 will be included in this section. In step S1210 (which may be optional), the UE receives input data provided by the host computer. Additionally or alternatively, in step S1220, the UE provides user data. In substep S1221 (which may be optional) of step S1220, the UE provides the user data by executing a client application. In substep S1211 (which may be optional) of step S1210, the UE executes a client application which provides the user data in reaction to the received input data provided by the host computer. In providing the user data, the executed client application may further consider user input received from the user. Regardless of the specific manner in which the user data was provided, the UE initiates, in substep 51230 (which may be optional), transmission of the user data to the host computer. In step S1240 of the method, the host computer receives the user data transmitted from the UE, in accordance with the teachings of the embodiments described throughout this disclosure.

Figure 13:
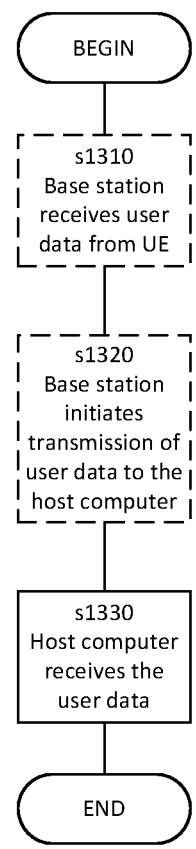
FIG. 13 is a flowchart illustrating a method implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 13 will be included in this section. In step S1310 (which may be optional), in accordance with the teachings of the embodiments described throughout this disclosure, the base station receives user data from the UE. In step S1320 (which may be optional), the base station initiates transmission of the received user data to the host computer. In step S1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A dynamic user equipment (UE) grouping method performed by a network node (NN), the method comprising:
   determining a first group of UEs for downlink (DL) data transmission, the first group of UEs comprising a first UE and a second UE;
   the transmitting to both the first UE and the second UE information informing the first and second UE that the network node has included the first and second UE in the first group of UEs;
   transmitting to both the first and second UE a first superimposed signal comprising a first message for the first UE and a second message for the second UE;
   receiving a first negative acknowledgement (NACK) transmitted by the first UE, the first NACK indicating that the first UE was unable to decode the first message;
   as a result of receiving the first NACK, determining a second group of UEs for DL data transmission, the second group comprising the first UE and a third UE;
   the transmitting to both the first and third UE information informing the first and third UE that the NN has included the first and third UE in the second group of UEs; and
   transmitting to both the first and third UE a second superimposed signal comprising the first message and a third message for the third UE.

2. The method of claim 1, wherein transmitting the first superimposed signal comprises:
   using a first set of beam forming weights to transmit the first superimposed signal.

3. The method of claim 2, wherein transmitting the second superimposed signal comprises using a second set of beam forming weights to transmit the second superimposed signal.

4. A network node (NN) configured to:
   determine a first group of user equipments (UEs) for downlink (DL) data transmission, the first group comprising a first UE and a second UE;
   transmit to both the first UE and the second UE information informing the first and second UE that the NN has included the first and second UE in the first group of UEs;
   transmit to both the first and second UE a first superimposed signal comprising a first message for the first UE and a second message for the second UE;
   receive a first negative acknowledgement (NACK) transmitted by the first UE, the first NACK indicating that the first UE was unable to decode the first message;
   as a result of receiving the first NACK, determine a second group of UEs for DL data transmission, the second group comprising the first UE and a third UE;
   transmit to both the first and third UE information informing the first and third UE that the NN has included the first and third UE in the second group of UEs; and transmit to both the first and a third UE a second superimposed signal comprising the first message and a third message for the third UE.

5. The NN of claim 4, wherein transmitting the first superimposed signal comprises:
using a first set of beam forming weights to transmit the first superimposed signal.

6. The NN of claim 5, wherein transmitting the second superimposed signal comprises using a second set of beam forming weights to transmit the second superimposed signal.

7. A computer program product comprising a non-transitory computer readable medium storing a computer program comprising instructions which, when executed by processing circuitry, causes the processing circuitry to carry out the method of claim 1.

* * * * *